Oct. 3, 1933.  B. ROSENBAUM  1,928,982
NUT LOCK
Filed Aug. 20, 1931  4 Sheets-Sheet 1

INVENTOR
B. Rosenbaum
BY Markes & Clerk
ATTORNEYS

Oct. 3, 1933.  B. ROSENBAUM  1,928,982
NUT LOCK
Filed Aug. 20, 1931  4 Sheets-Sheet 4

INVENTOR:
B. Rosenbaum
BY Marks & Clerk
ATTORNEY

Patented Oct. 3, 1933

1,928,982

UNITED STATES PATENT OFFICE 1,928,982

NUT LOCK

Bedřich Rosenbaum, Prague, Czechoslovakia, assignor to the firm Prager Eisen-Industrie-Gesellschaft, Prague, Czechoslovakia Application August 20, 1931, Serial No. 558,402, and in Czechoslovakia June 23, 1931

11 Claims. (Cl. 151—19)

This invention relates to a nut lock which, with very considerable saving of material, unusually compact construction, as also ready adaptability for mass production, ensures an astounding locking of the screw connection against loosening and a preservation of the screw-threading which was hitherto unattainable.

Nut locks for additional radial locking are already known, which consist of a conically recessed outer nut and an inner nut provided with flexible clamping cheeks, which in axial cross section show two flexure cross sections, the first being between the clamping part and the connecting part of the cheeks and the second between the connecting part of the cheeks and the rigid annular part of the inner nut.

However, none of these known nut locks achieves what is accomplished by the present invention, namely, that when the screw connection is loaded and tightened, all threads of both nuts fit closely with all their bearing flanks against the bearing flanks of the bolt.

This is attained in that the connecting part increases in diameter from the first flexure cross section to the second flexure cross section in such a manner that it forms a body which is tapered toward the outer end of the bolt.

Moreover, according to the invention, the connecting part is designed in such a manner that it has such a wedge shape that a part of the neutral fibers of its cross section extends approximately at right angles to the bearing flanks of the threading.

In the drawings:—

Figure 6:
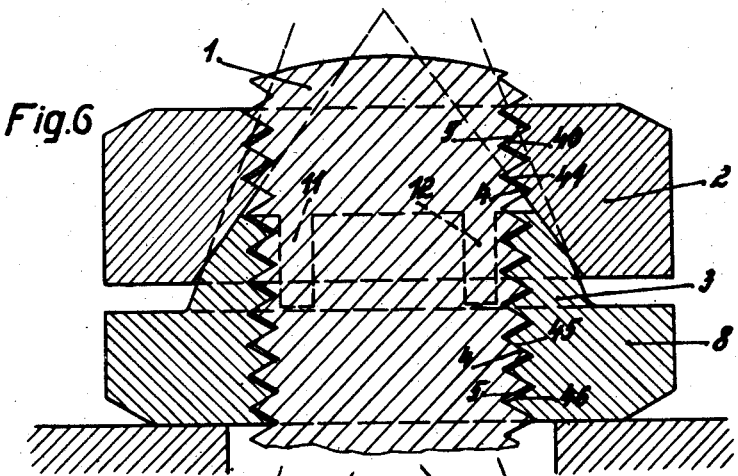
Figure 7:
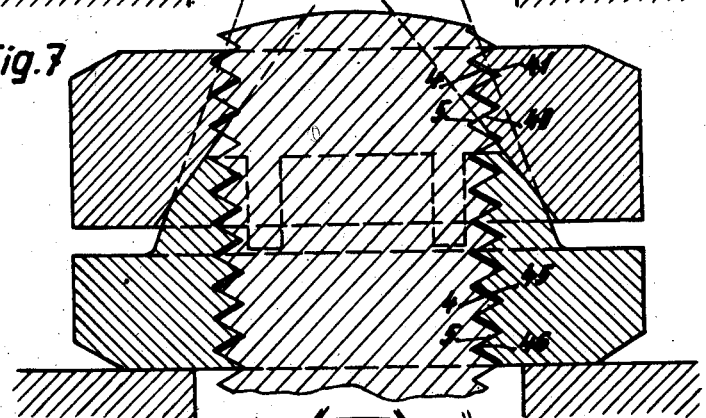
Figure 8:
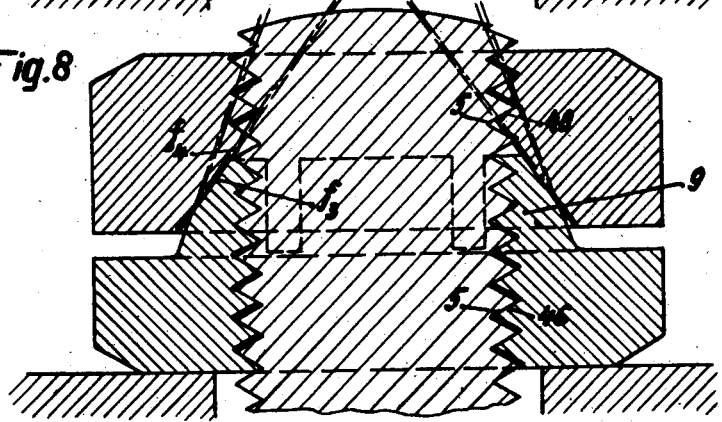

Figs. 6, 7 and 8 are longitudinal sections of the screw connection in the three most important operating positions of the nuts. Fig. 6 shows the screw connection unloaded and not tightened up. Fig. 7 shows the screw connection loaded and not tightened up. Fig. 8 shows the screw connection in the loaded condition and with the nuts tightened up.

Figure 9:
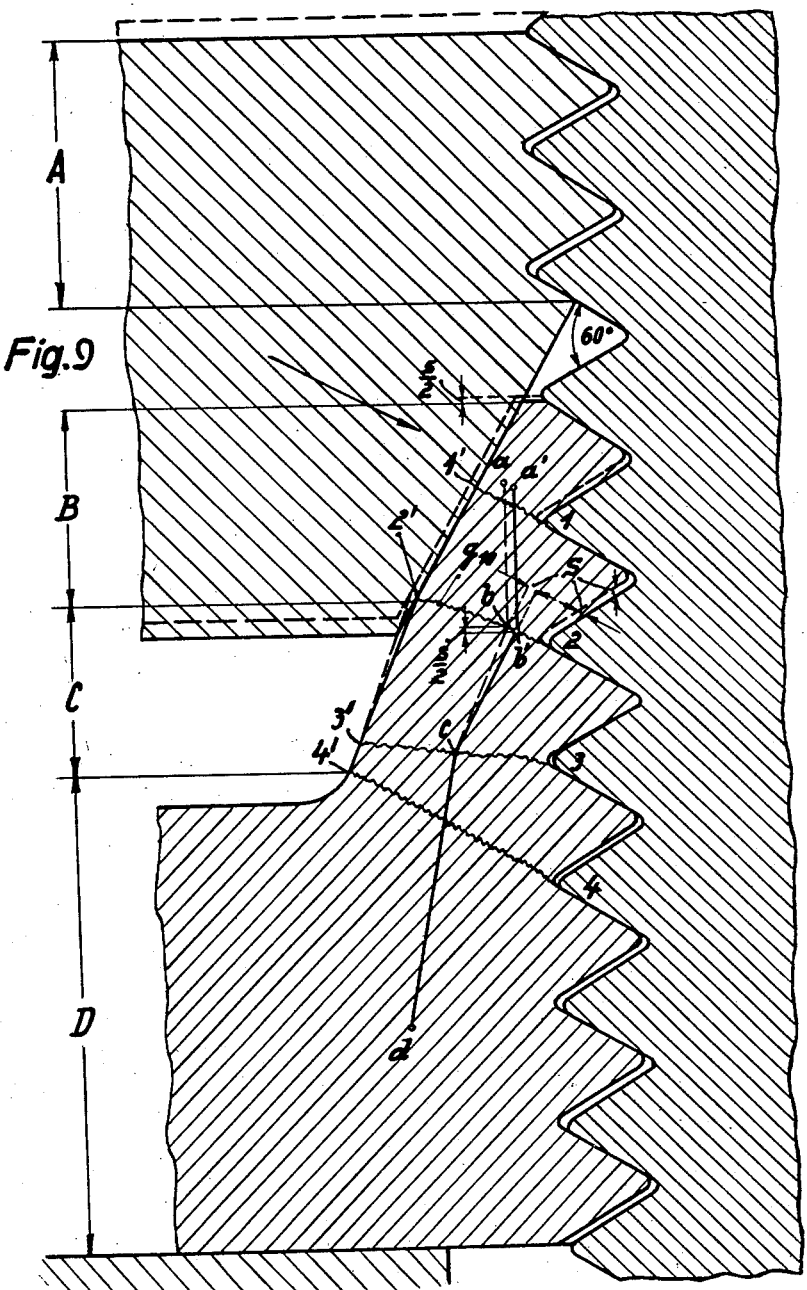

Fig. 9 serves to illustrate the deformation occurring on the tightening up of the nut lock.

The method of construction of the individual examples will first be described from the purely constructional point of view.

Figure 1:
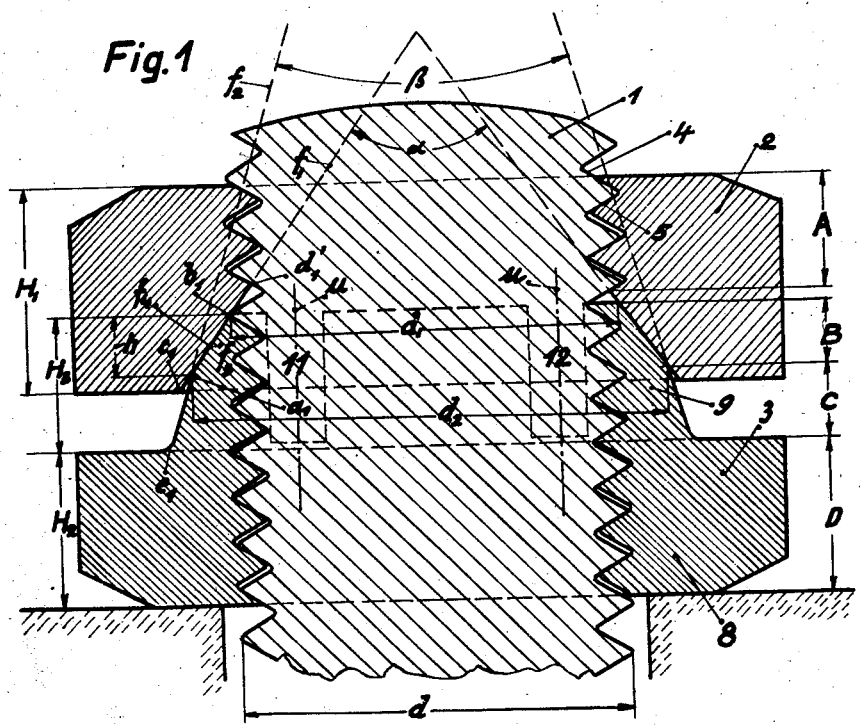
Fig. 1 is a longitudinal section through the nut lock in the tightened-up condition.
Figure 2:
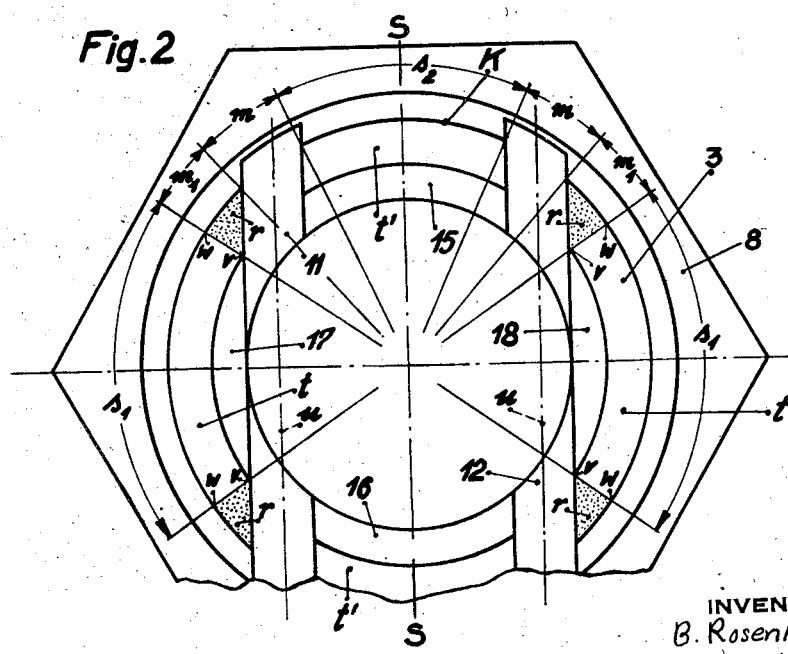
Fig. 2 is a plan view of the inner nut.

In Figs. 1 and 2 the bolt is denoted by 1, the outer nut by 2, and the inner nut by 3. 4 are the outer flanks and 5 the inner flanks of the threads of the bolt. The inner nut 3 consists of an annular portion 8 and of a flexible extension 9 formed integrally therewith. The annular portion 8 has six spanner faces. The extension 9 is tapered in from the end adjoining the annular portion 8 towards its outer end, and is bounded, in the example shown in Fig. 1, by two cone frustum surfaces $f_1$, $f_2$ the apex angles of which are $\alpha$ and $\beta$. The surface formed by the generatrices $a_1$, $b_1$ of the cone frustum $f_1$ is the bearing surface of the inner nut.

The extension 9 of the inner nut is provided with slots 11, 12 which run parallel to each other and at right angles to the opposed spanner surfaces. The relative disposition and dimensioning of these slots will be explained in due course, together with a statement of the advantages gained by the novel locking principle conditioned thereby.

Figure 3:
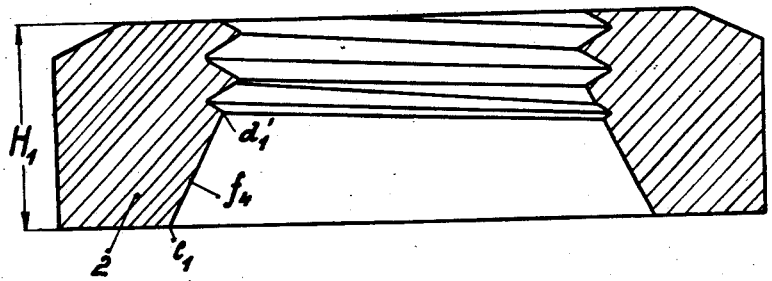
Figs. 3 and 5 show the outer nut and the inner nut, respectively, each in longitudinal section.
Figure 4:
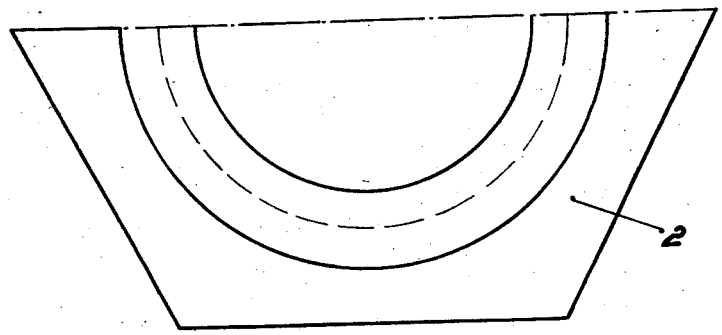
Fig. 4 is a bottom view of one half of the outer nut.

The outer nut (Fig. 3) possesses, in the present constructional example, the same spanner size as the inner nut, but its height $H_1$ is greater than the height $H_2$ of the annular portion of the inner nut. Its peripheral surface is likewise provided with six spanner faces.

The outer nut 2, as compared with the usual types of nut lock, has a threaded portion of very slight height (approximately only 2½ turns) which is, however, fully sufficient for the required tightening. This small total height of the threaded portion of the outer nut is a feature which contributes particularly effectively to the compensation of any chance eccentricity in the conical bearing surfaces between the nuts. Such eccentricity can easily occur when manufacturing is conducted on mass production lines, the bearing surfaces of the two nuts being then not absolutely concentric to the middle axis of the threads.

The outer nut, precisely in consequence of its narrow threaded zone, is eminently adapted to compensate such eccentricity as between the conical bearing surfaces, by virtue of its ability to become displaced laterally across the threading of the bolt, without appreciable reduction of the contacting surface, that is to say as if it would be displaced along three concentric conical surfaces which touch the corresponding bearing flanks of the threading of the bolt.

In the interior of the outer nut there is a recess the conical surface of which, in the present constructional example, coincides with the conical surface $f_3$ of the inner nut. The cone frustum surface determined by the generatrices $c_1$, $d_1'$ constitutes the counter surface $f_4$ of the outer nut. This counter surface cuts interruptedly across the thread of the outer nut, and is so dimensioned that, when the screw connection is under strain and tightened up with the spanner (Fig. 8), this surface juts beyond the bearing surface $f_3$ of the inner nut, with a view to eliminating dangerous edge tensions in the outer nut.

Figure 5:
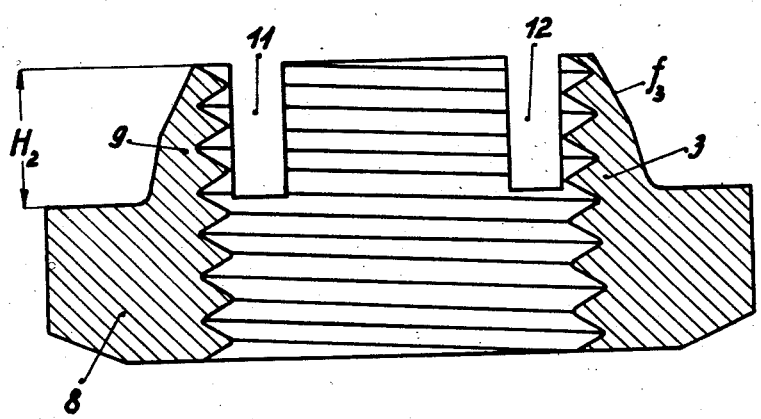

As will be seen from Fig. 5, the clamping cheeks of the inner nut, considered in longitudinal section, take the form approximately of bodies having equal resistance to bending strain, and are as thin at their heads as is possible without giving rise to difficulties in manufacture. The purpose of this feature is to enable the deformation of the cheeks to be uniform throughout their length when the screw connection is tightened up, with a view to the avoidance of fractures, and to ensure that, on the tightening up of the lock nut, the cheeks be pressed into the threads with a minimum expenditure of energy.

The obtaining of a very considerable locking moment is rendered possible by the fact that the cone of the outer nut is continued into the threaded zone, while at the same time the clamping jaws are made as thin as possible at their outer ends. The outer nut is thus weakened as little as possible by the conical recess provided as a protection against spreading by the force applied in tightening, while the clamping cheeks in their turn, since they are made as thin as possible at their outer ends, can be brought into intimate contact with the threading of the bolt, and that both in a longitudinal and in a transverse sense, when the nuts are tightened up. Measurements have shown that the locking moment thus obtainable is approximately twice as great as that obtainable with ordinary crown-nuts with split pin.

In accordance with the invention the peripheral surface of the clamping cheek member of approximately uniform bending strength is formed of two intersecting conical surfaces which constitute the tangential surfaces to a rotation figure the axis of which coincides with the axis of the bolt, and the generatrix of which is a cubic parabola.

In all the constructional examples the bearing surface $f_4$ of the outer nut with which the latter presses upon the inner nut is preferably extended up to or into the threaded zone of the screw connection.

According to the invention, the clamping cheek body is greater in diameter at the transition between the rigid annular part and connecting part than at the transition between the connecting part and clamping part and the conical surface with which the outer nut bears upon the inner nut extends into the thread.

This latter provision is made for the reason that if the usual shoulder for the thread were to be formed on the outer nut, it would be necessary to leave a suitable clearance between this shoulder and the inner nut, in order to prevent contact being formed between the shoulder and this nut before the conical bearing surfaces are tightened sufficiently one upon the other. In consequence of this clearance the conical end of the inner nut would have to be made far thicker than is the case by virtue of the above-mentioned feature in accordance with the invention. Further, the manufacturing of the outer nut without the said shoulder is simpler and cheaper, and the resistance of the nut so made to spreading and tearing is greater. The elimination of the shoulder enables the thickness of the cheeks at the outer end to be reduced to such an extent that a thread can just be cut therein, and at the same time an uninterrupted sharp edge to the end of the cheek is ensured.

The procedure and the stages in the behaviour of the nut lock when the screw connection is loaded and tightened up can be explained with reference to Figs. 6 to 9, as follows:—

When the nut lock is tightened up by hand without being loaded, the outer nut 2 and the inner nut 3 assume the respective positions shown in Fig. 6. The bolt rests with the inner thread flanks 5 on the outer thread flanks 40 of the outer nut. Between the outer thread flanks 4 of the bolt and the inner thread flanks 41 of the outer nut there is a clearance corresponding to the permissible looseness of fit. Throughout the length of the inner nut the outer thread flanks 4 of the bolt rest in contact with the inner thread flanks 45 of the inner nut. Between the inner thread flanks 5 and the outer thread flanks 46 of the inner nut there is again the clearance corresponding to the permissible degree of fit.

With the bolt loaded and the outer nut tightened by hand only (Fig. 7), the bolt rests with the inner thread flanks 5 in contact both with the outer thread flanks 40 of the outer nut and with the outer thread flanks 46 of the inner nut, without there being necessarily equal distribution of pressure over all the bearing flanks.

With the bolt loaded and the outer nut tightened up with a spanner (Fig. 8), the bearing flanks (inner flanks 5) of the bolt threading form contact with the outer flanks 40, 46, of the threads of both nuts, and that with approximately uniform distribution of pressure.

On tightening the nut lock with a spanner the counter surface $f_4$ of the outer nut is forced, during tightening up, in an axial direction against the inner nut, and exerts pressure upon the surface of application $f_3$ of the inner nut. The extension 9 which forms the clamping cheeks is thereby altered in shape. In accordance with the invention, the clamping cheeks of the inner nut are so shaped and constructed that they are capable, in consequence of the above-mentioned deformation under the action of the outer nut, during their flexure into engagement with the threading of the bolt, of becoming displaced with their clamping threading approximately parallel to the bearing flanks of the threading. This arrangement enables the following result to be obtained, namely that, when the nuts are tightened one upon the other, such preselected alterations are brought about in the fit between the threads that all the turns of the threading of both nuts can be brought with their bearing flanks into pressing contact with the bearing flanks of the threading of the bolt.

For the more accurate understanding of the procedure occurring on the tightening up of the nut lock, attention is drawn to the following theoretical discussion of this procedure, reference being had to Fig. 9 of the drawings:

The characteristic cross-sections of the clamping cheek, taken in order from the thin outer end of the cheek towards the base thereof, are denoted by 1 1', 2 2', 3 3', and 4 4', respectively.

When the outer nut is tightened, the clamping cheeks begin to bend first at the cross-section 3 3' (and partly at the cross-section 4 4'), in that they bend approximately about the neutral point c. As soon as the first turn of the threading on the cheek bears against the thread of the bolt, the cheeks begin to bend, on continued tightening, at the cross-section 2 2', and that under the influence of the pressure of the outer nut which now acts upon the cheeks at the contacting edge between the two cones. The flexure at the cross-section 2 2' ceases as soon as the cheeks bear fully with both flanks against the threading of the bolt. At this stage the pressure exerted by the outer nut upon the clamping cheeks has become distributed over the entire contacting surface of the cones, and the tightening up of the outer nut is completed.

$a\ b\ c\ d$ denotes approximately the course of the neutral fibre in the clamping cheek at the commencement of the tightening of the nut lock. During the further tightening of the nut lock the neutral fibre layer passes from the position $a\ b\ c\ d$ to the position $a'\ b'\ c\ d$, $b\ c$ and $b'\ c$ passing divergingly through the point $c$. The distance $b\ b'$ corresponds to the clearance $s$ between the threads of the inner nut and the threading of the bolt, measured parallel to the inner flank of the bolt threading. With threads having an apex angle of 60° this distance is likewise equal to the axial play between the threads. The distance $b\ b'$ forms the one side of an isosceles triangle the side $s$ of which is parallel to the axis of the bolt. It thus follows that the point $b$, after displacement into the position $b'$, has become lowered from its original position in the direction of the axis of the bolt to the extent of $\frac{s}{2}$. It further follows that, through this flexure of the cheek, the inner nut has become shortened as to its part from the annular portion 8 upwards by the amount $\frac{s}{2}$.

Referring to Fig. 9, the portion $a\ b$ of the neutral fibre thus becomes displaced parallel to itself into the position $a'\ b'$, the direction $a\ a'$ and $b\ b'$, respectively, being parallel to the bearing flank of the threading. In this manner a hugging fit is obtained between the clamping thread and the corresponding bolt thread.

In the known types of locking device with slotted clamping nut acted upon by an outer nut the neutral fibre layer is displaced not parallel to the bearing flank but substantially at right angles to the axis of the threading. With these types of construction, the inner flanks of the bolt threads are a hindrance to the displacement of the inner nut. For this reason also a downward movement of the inner nut must take place. Thus, in the known types of nut locking devices although the clamping thread of the inner nut bears in fact against the threading of the bolt, there is play between the threads of the annular portion of the inner nut and the threading of the bolt in an upward and in a downward sense.

The preselected degrees of fit obtained over the entire length of the nut lock on the tightening of the nuts in the described locking device are thus distributed over the following four zones:

1. A zone A (Figs. 1 and 9) in which the outer thread of the outer nut 2 bears against the inner thread flanks 5 of the bolt.

2. A zone B in which the thread of the inner nut 3 presses against both flanks 4, 5 of the threading of the bolt.

3. A third zone C in which, in consequence of the alteration in shape of the inner nut, a bearing of the thread of the inner nut against the flanks of the threading of the bolt takes place without appreciable clamping action.

4. A fourth zone D in which, in consequence of the shortening of the inner nut brought about by the described alteration in shape, the thread of the inner nut is caused to bear against the inner flanks 5 of the threading of the bolt. This bearing takes place without the lifting of the inner nut from its supporting surface, since the inner nut is shortened merely in respect of its portion above the annular section 8.

In the case of Whitworth threads with an apex angle of 55° the cheeks of the inner nut are likewise shortened by the tightening up of the nut, to the extent of one half of the axial play between the threads, although in the case of these threads the apex angle of the cone described about the clamping cheeks should be correspondingly smaller, so that the neutral fibre $b\ c$ be at right angles to the bearing flank of the thread.

The described feature of the shortening of the inner nut by mere flexure of the clamping cheeks is theoretically correct. It can, however, happen in practice that the cheeks, when the designing or the manufacturing is inaccurate, are not absolutely of the technically correct shape, with the result that, after completed flexure of the cheeks, there still remains a slight clearance between the bearing flanks in the zone D.

Account should further be taken of the fact that the tightening up of the outer nut implies considerable strain upon the bearing flanks of its threading, whereas the bearing flanks in the zone D could come in contact with the bearing flanks of the threading of the bolt without mutual pressure. For this reason the provision of means for equalizing the pressures in the zones A and D is indicated.

In order to equalize the pressures on the flanks of the threads in the zones D and A, and in order to eliminate any clearance in the zone D resulting from manufacturing inaccuracies, there is provided a compressible cross-section $q_{10}$ between the zones B and C. The compressible cross-section $q_{10}$ is situated approximately in the middle of the total height of both nuts. The threads of these nuts are so dimensioned that the axially directed force required to compress this cross-section in a parallel direction bears the same ratio to the maximum tensile strength of the bolt as the bearing strength or equally the effective length of the threading of both nuts situated between this cross-section and the free outer end of the bolt bears to the bearing strength or effective length of all the turns of the threading of both nuts.

With the most favourable dimensioning of the individual parts, the compressible cross-section $q_{10}$ is approximately in the middle of the over-all height of the two nuts. The resistance of the outer nut to spreading strains is intentionally less than that of its threading. Although for complete tightening it is sufficient to turn the outer nut through 60-120° after coming in contact with the inner nut, the safety of the screw connection is by no means endangered if the outer nut be turned more than 720°, that is to say through more than two complete revolutions. Up to an angle of 480° the outer nut spreads, but without tearing, and only from this point on does deformation of the thread occur. There is thus no danger, even with very inexpert handling.

The theoretical treatment of the subject matter of the invention here given requires to be qualified by the statement that the explanation of the deformation of the clamping cheeks with the aid of the neutral line $a\ b\ c\ d$ only approximates to the truth. The individual cheeks actually bend in the manner of a column held fast in the rigid annular portion of the inner nut, bearing against the bolt at its upper end, and subjected to the pressure of the outer nut in its middle part. The assumed straight line $b'\ c$ is thus, strictly speaking, not a straight line but a curve of the third degree with two points of inflexion. There is a further slight deviation from the behaviours of the cheeks as explained theoretically, in the fact that these cheeks are not rectangular but circular in cross-section. It is sufficient for the straight line $b\ c$ to form with the bearing flank of the thread an angle slightly smaller than 90°, to ensure that, by the tightening of the cheeks, the height of the nut will be decreased by the required amount of $\frac{s}{2}$.

It has been found that the following relations between the most important dimensions of the nut lock must subsist if the objects aimed at are to be obtained to the greatest possible extent:

The apex angle $\alpha$ of the conical shaped bearing surface of the inner nut should be between the limits of 45° and 60°; the most favourable angle in the constructional example under discussion is 52½°. The apex angle of the transition surface situated between the bearing surface and the annular portion 8 of the inner nut (the angle $\beta$) should preferably be between the limits of 15° and 45°; the most favourable angle in the constructional example under discussion is 30°.

The diameter $d_1$ of the circle described about the head end of the clamping cheeks is approximately equal to 1.05 of the nominal diameter $d$ of the thread; the height of the two conical surfaces of the clamping cheeks is approximately equal.

The distance between the mid lines $u, u$ of the slots 11, 12 is preferably taken as $0.7d$ and the breadth of the slots as $0.15d$, $d$ being the diameter of the bolt.

As can be seen from Figs. 2, 6, 7 and 8, the breadth of the slots 11 and 12 is unusually great, further advantages being achieved by this feature. The breadth of the cheeks is reduced in this manner, the flexibility of the cheeks is increased, and the attainment of the required magnitude of the cross-section $q_{10}$ is ensured.

In addition, the particular arrangement and dimensioning of the slots herein described leads to the following results of practical importance:

As can be seen from Fig. 2, it is possible to distinguish, in the clamping cheeks $t$, portions $r$ which are flexible about the cross-section $v\ w$, and which can readily bend under the pressure of the outer nut, and an intermediate rigid part which does not yield to the pressure of the outer nut. On the other hand the entire breadth of the clamping cheeks $t'$ can be regarded as resistant to the pressure of the outer nut.

There are thus between the resistant portions of the checks broad intermediate spaces which offer to the pressure of the outer nut partly no resistance (slots $m$) and partly very slight resistance (portions $r$). Measured at the circle of intersection between the two conical surfaces, the peripheral length of the intermediate spaces is given as that enclosed by the angle $(m+m_1)$. The peripheral breadth of the rigid portions of the clamping cheeks is given as that enclosed by the angles $s_1$ and $s_2$, respectively. The arcs of the circle K enclosed by the angles $(m+m_1)$ are approximately half as long as those enclosed by the angle $s_1$, and somewhat more than half as long as those enclosed by the angle $s_2$.

The consequence of the provision of the described intermediate spaces is that, during the tightening up, the outer nut becomes so deformed that its conical surface assumes approximately octagonal shape. Further, in consequence of this impressing of the outer nut between the clamping cheeks, it is possible by tightening up the outer nut to transmit an adequate tightening moment to the inner nut so that in practice a very convenient method of tightening is provided.

It has been proved that the turning moment which can be transmitted to the inner nut with the aid of the described deformation of the outer nut is almost twice as great as that which can be transmitted by mere friction between the bearing surfaces. The ratio of the arcs of the circle K enclosed by the angles $(m_1+m_2)$ to those enclosed by the angles $s_1$ or $s_2$, respectively, is so determined that when the screw connection is tightened up by the outer nut alone, not more than the permissible strain can be transmitted thereto. As the load increases it will be clear that the friction between the inner nut and the object against which it is screwed will increase also, so that the inner nut ceases to turn as soon as the limit of permissible strain for the bolt has been reached. In this manner the further advantage over other systems is obtained that an effective safeguard is provided against damaging or tearing of the bolt by excessive tightening.

Further, in consequence of the deformation of the outer nut, a connection is obtained which is far more resistant to loosening than would be the case if reliance were to be had merely on the friction between the bearing surfaces.

It has been found to be most advantageous to make the arc of the circle K enclosed by the angle $(m_1+m)$ approximately half as long as that enclosed by the angle $s_1$ or $s_2$. With a shorter arc corresponding to that of the angle $(m+m_1)$ it would not be possible to transmit an adequate turning moment from the outer to the inner nut, and to make these arcs longer would in the first place be prejudicial to the bearing strength of the nut threads, and in the second place would lead to too great a deformation of the outer nut.

Tests have further proved that a minimum of over-all length combined with adequate bearing strength of the threads are obtained if the application surface $f_4$ be given a minimum diameter of $d_1=1.05\ d$, a maximum diameter of $d_2=1.233\ d$, and an axial height of $h=0.175\ d$ being the diameter of the bolt. At the same time the height of the outer nut $H_1=0.55\ d$, the height of the annular portion of the inner nut $H_2=0.4\ d$, and the height of the extension of the inner nut $H_3=0.35\ d$.

The most important advantages of the nut lock provided by the present invention are the following:

With the least possible expenditure of material and with the least possible requirement in the matter of space, a nut lock is obtained which possesses astonishingly improved locking efficiency, and which at the same time spares the material of the threading to an extent hitherto not attainable. The nut lock does not become loosened when subjected to the severest strains, even when combined with jarring, and can be employed with confidence in place of far more expensive types of locking nuts. The present lock protects the threading from wear and tear in a manner not hitherto attained, a point which is of considerable economic importance in view of the large consumption of bolts. In cases in which it becomes necessary to tighten up the nut from time to time, it is sufficient merely to tighten the outer nut alone with a spanner, since the inner nut turns with the outer nut until it bears firmly. In this manner the new locking nut also protects the bolt from damage through too powerful tightening. It will be clear that if nuts be tightened by means of the outer nut alone, the tension transmitted to the bolt cannot exceed the permissible limit.

The bolt stress is distributed, in a manner hitherto unattainable, perfectly uniformly over the threads of both nuts, the accomplishment of this unique effect being at the same time ensured with mass production by the dimensioning rules given above. At the same time all necessary precautions are taken to ensure that the possible overstraining which may occur through abuse cannot take effect at invisible points in the system, and thus give rise to accidents. If overstraining should occur, the prismatic ring portion of the inner nut will also become deformed, in consequence of its slight height, and the occurrence of dangerous strains and stresses in the system is thereby effectually prevented.

Having thus fully described the invention what is claimed and desired to be secured by Letters Patent is:

1. A nut lock for additional radial locking consisting of a conically recessed outer nut and an inner nut provided with flexible clamping cheeks, which in axial cross section show two flexure cross sections, the first of which is situated between the clamping part (zone B) and the connecting part (zone C) of the cheeks and the second between the connecting part (zone C) thereof and the rigid annular part of the inner nut (zone D), characterized by the fact that the connecting part increases in diameter from the first flexure cross section to the second flexure cross section in such a manner that it is designed as a member which is tapered toward the outer end of the nut.

2. A nut lock according to claim 1, characterized by the fact that the connecting part (C) of the clamping cheeks in axial section is of such wedge shape that a portion (b—c) of the neutral fiber of its cross section extends approximately at right angles to the bearing flanks of the threading.

3. A nut lock according to claim 1, characterized by the fact that the clamping cheek member is greater in diameter at the transit (4, 4') between the rigid annular part (D) and connecting part (C) than at the transit (2, 2') between connecting part (C) and clamping part (B) and the conical surface ($f_4$) provided for the bearing of the outer nut against the inner nut extends into the threading.

4. A nut lock according to claim 1, characterized by the fact that the clamping cheeks of the inner nut, as seen in longitudinal section, take the form approximately of bodies of uniform bending strength, and are shaped at their head ends as thinly as is possible without giving rise to manufacturing difficulties.

5. A nut lock according to claim 1, characterized by the fact that the peripheral surface of the clamping cheek body having substantially uniform bending strength is formed of two intersecting cones which constitute the tangential surfaces to a rotation figure the axis of which coincides with the axis of the bolt, and the generatrix of which is a cubic parabola.

6. A nut lock according to claim 1, characterized by the fact that the angle at the apex of the conical application surface of the inner nut is an angle of 45°—60°, and that the angle at the apex of the conical transition surface situated between the said application surface and the annular portion of the inner nut is an angle of 15°—45°.

7. A nut lock according to claim 1, characterized by the fact that the diameter $d_1$ of the circle described about the head end of the clamping cheeks is approximately equal to 1.05 of the nominal diameter $d$ of the thread, and that the two conical surfaces of the clamping cheeks are approximately equal in height.

8. A nut lock according to claim 1, characterized by the fact that the compressible cross-section ($q_{10}$), which is situated at about the middle of the total height of both nuts, and the threading are so dimensioned that the axially directed force required to compress this cross-section bears the same ratio to the maximum tensile strength of the bolt as the bearing strength or, alternatively, the effective length of the threading of both nuts from this cross-section on towards the outer end of the bolt bears to the bearing strength or to the effective length of all the threading of both nuts.

9. A nut lock according to claim 1, characterized by the fact that the slots (11, 12) which are disposed parallel to each other and at right angles to the opposed spanner faces, are of such breadth and are so distanced from each other that the circumferential length ($m$) of the slots augmented by the circumferential length ($m_1$) of the portions ($r$) which are flexible about the cross-section ($v\ w$) is approximately half as long as the circumferential length of the clamping cheeks (17, 18) containing the flexible portions ($r$) and somewhat more than half as long as the remaining cheeks (15, 16), whereby all circumferential lengths are measured on the circle (K) formed by the conical surfaces.

10. A nut lock according to claim 1, characterized by the fact that the slots (11, 12) which are disposed parallel to each other and at right angles to the opposed spanner faces, are of such breadth and are so distanced from each other that the circumferential length ($m$) of the slots augmented by the circumferential length ($m_1$) of the portions ($r$) which are flexible about the cross-section ($v\ w$) is approximately half as long as the circumferential length of the clamping cheeks (17, 18) containing the flexible portions ($r$) and somewhat more than half as long as the remaining cheeks (15, 16), whereby all circumferential lengths are measured on the circle (K) formed by the conical surfaces, and the mid lines ($u, u$) of the slots (11, 12) being distanced from each other by the amount $0.7d$, and said slots being approximately $0.15d$ wide, $d$ being the diameter of the bolt.

11. A nut lock according to claim 1, characterized by the fact that, for the purpose of obtaining, on the one hand, the least possible over-all length of construction, and, on the other hand, the greatest possible bearing strength and power of resistance in the individual threads, when the diameter of the bolt is $d$ the application surface ($f_4$) is given a smallest diameter of $d_1 = 1.05\ d$, a largest diameter of $d_2 = 1.233\ d$, and an axial height of $h = 0.175\ d$, while the height of the outer nut $H_1 = 0.55\ d$, the height of the annular portion of the inner nut $H_2 = 0.4\ d$, and the height of the extension portion of the inner nut $H_3 = 0.35\ d$.

BEDŘICH ROSENBAUM.